United States Patent
Mehra

(10) Patent No.: US 8,953,605 B1
(45) Date of Patent: Feb. 10, 2015

(54) METHODS AND APPARATUS FOR A HANDSHAKE PROTOCOL IN A LAG-BASED MULTIPATH SWITCH FABRIC FOR MULTIPATH OAM

(75) Inventor: Ashwani Kumar Mehra, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 488 days.

(21) Appl. No.: 13/342,595

(22) Filed: Jan. 3, 2012

(51) Int. Cl.
*H04L 12/28* (2006.01)
(52) U.S. Cl.
USPC ............................................. 370/392
(58) Field of Classification Search
CPC ........... H04L 1/18; H04L 12/26; H04L 12/28; H04L 12/50; H04L 12/56; H04J 3/14; H04J 3/16
USPC ............ 370/225, 235, 395.21, 394, 255
See application file for complete search history.

(56) References Cited

U.S. PATENT DOCUMENTS

| | | | |
|---|---|---|---|
| 7,002,926 B1* | 2/2006 | Eneboe et al. | 370/255 |
| 7,907,616 B1* | 3/2011 | Breau et al. | 370/395.21 |
| 2011/0019550 A1* | 1/2011 | Bryers et al. | 370/235 |
| 2011/0026403 A1* | 2/2011 | Shao et al. | 370/235 |
| 2011/0185065 A1* | 7/2011 | Stanisic et al. | 709/226 |
| 2014/0040488 A1* | 2/2014 | Small et al. | 709/228 |

OTHER PUBLICATIONS

Amante, S. et al., Operations and Maintenance Next Generation Requirements, Internet-Draft, Feb. 21, 2008, 22 pages.

* cited by examiner

*Primary Examiner* — Kwang B Yao
*Assistant Examiner* — Syed M Bokhari
(74) *Attorney, Agent, or Firm* — Cooley LLP

(57) ABSTRACT

In some embodiments, an apparatus comprises a first switch configured to define an initialization packet that has a header value associated with a port from a set of ports associated with a link aggregation group. The first switch is configured to send the initialization packet to a second switch via the port based on the header value. The first switch is configured to receive an acknowledgement packet including the header value from the second switch in response to the second switch receiving the initialization packet. The first switch is configured to retrieve the header value from the acknowledgement packet such that the first switch defines, in response to the first switch receiving the acknowledgement packet, a response packet having the header value. The first switch is configured to send the response packet to the second switch via the port based on the header value.

20 Claims, 8 Drawing Sheets

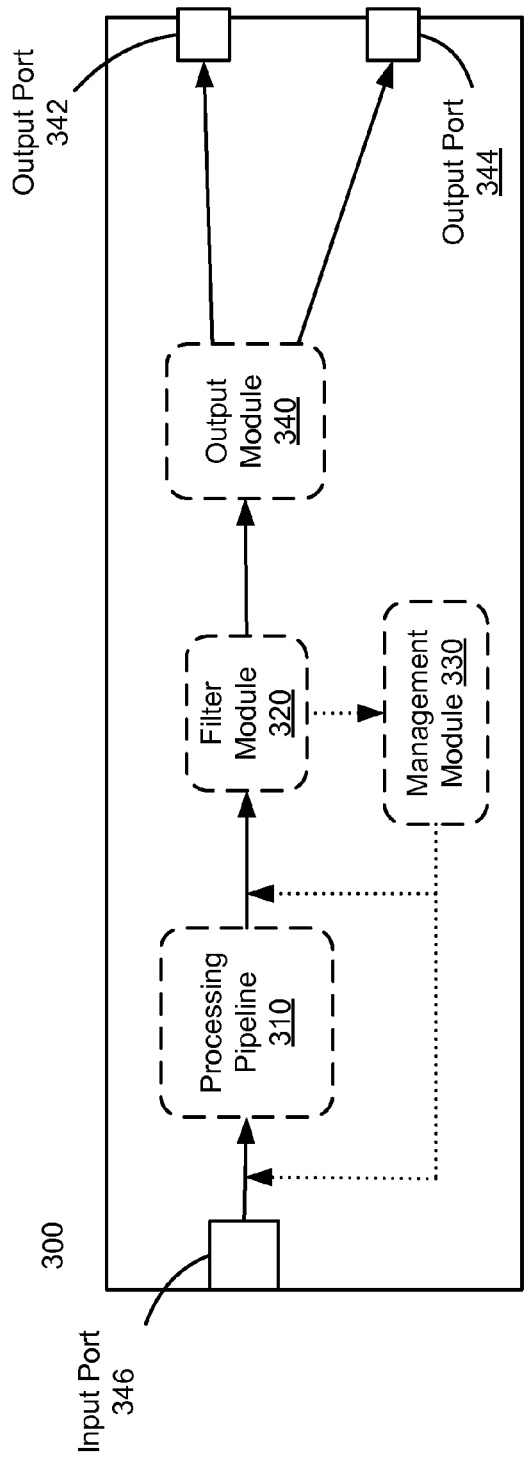

600

700

800

METHODS AND APPARATUS FOR A HANDSHAKE PROTOCOL IN A LAG-BASED MULTIPATH SWITCH FABRIC FOR MULTIPATH OAM

BACKGROUND

Some embodiments described herein relate generally to multipath switch fabrics, and, in particular, to methods and apparatus for implementing a handshake protocol in a link aggregation group (LAG)-based multipath switch fabric for multipath operations, administration and maintenance (OAM).

Some known switch fabrics implement a standard three-way handshake protocol to confirm bidirectional connectivity between two neighboring switches. Based on such a standard three-way handshake protocol, an upstream switch establishes bidirectional communication with a downstream neighboring switch by exchanging three regular messages on the connecting link between the two switches. In a LAG-based multipath switch fabric, an upstream switch is typically connected to multiple downstream neighboring switches, and a message is sent from the upstream switch to a downstream neighboring switch based on, for example, a LAG hashing mechanism. As a result, a regular message is typically not deterministically sent to a given downstream switch. Thus, the standard three-way handshake protocol cannot be implemented for two neighboring switches in the LAG-based multipath switch fabric.

Accordingly, a need exists for a handshake protocol that can be used to confirm bidirectional connectivity of two neighboring switches in a LAG-based multipath switch fabric, thus multipath OAM can be performed for that multipath switch fabric.

SUMMARY

In some embodiments, an apparatus comprises a first switch configured to define an initialization packet that has a header value associated with a port from a set of ports associated with a link aggregation group. The first switch is configured to send the initialization packet to a second switch via the port based on the header value. The first switch is configured to receive an acknowledgement packet including the header value from the second switch in response to the second switch receiving the initialization packet. The first switch is configured to retrieve the header value from the acknowledgement packet such that the first switch defines, in response to the first switch receiving the acknowledgement packet, a response packet having the header value. The first switch is configured to send the response packet to the second switch via the port based on the header value.

BRIEF DESCRIPTION OF THE DRAWINGS

FIG. 3 is a schematic illustration of a downstream switch, according to an embodiment.

FIG. 4 is a schematic illustration of a reverse hash lookup table implemented in a switch, according to an embodiment.

DETAILED DESCRIPTION

Figure 1:
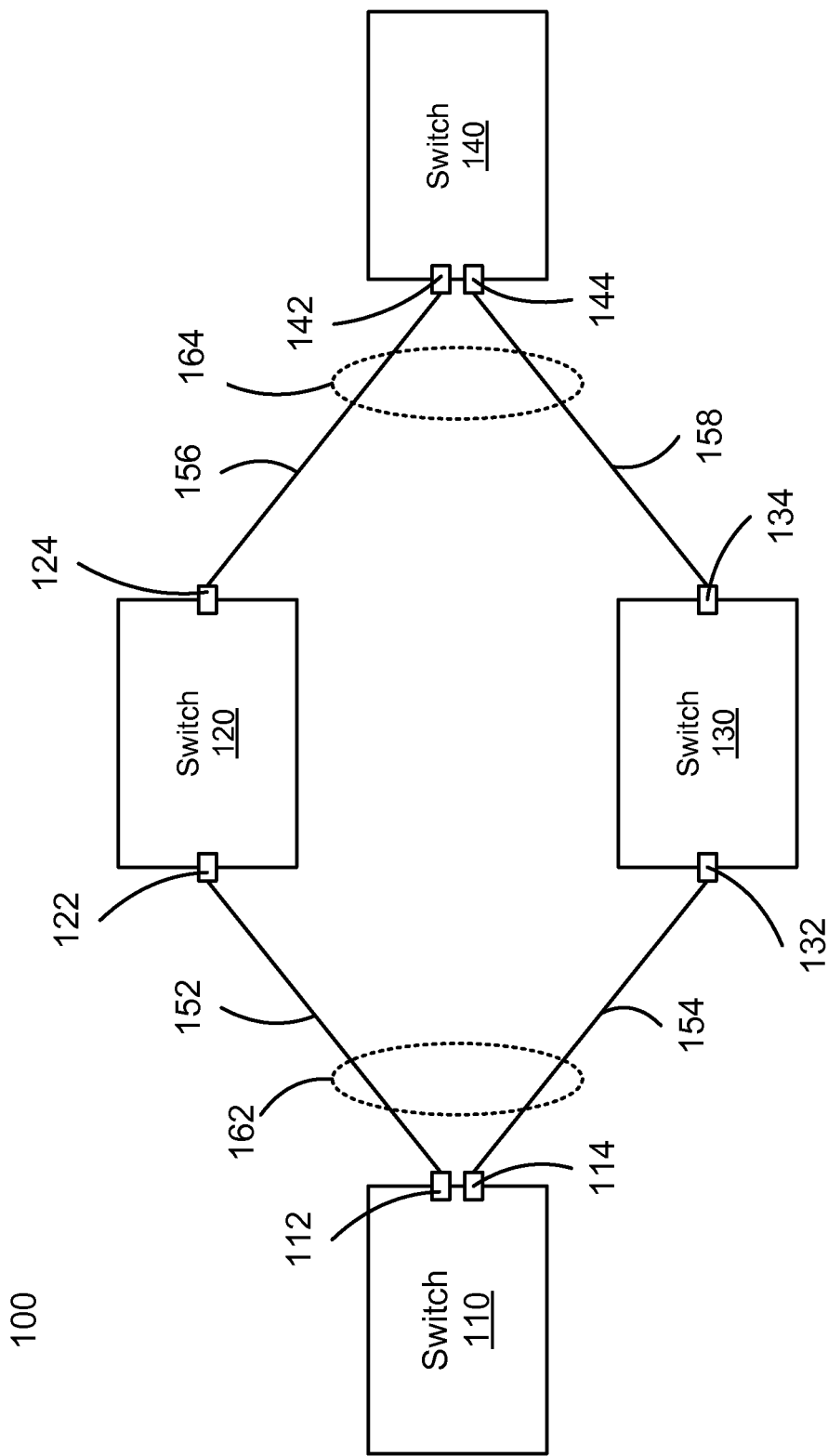
FIG. 1 is a schematic illustration of a LAG-based multipath switch fabric, according to an embodiment.

In some embodiments, an apparatus includes a first switch within a first stage of a distributed link aggregation group (LAG)-based multipath switch fabric. The first switch is configured to define an initialization packet having a header value associated with a port from a set of ports associated with a LAG. For example, the first switch is configured to assign the header value to the initialization packet using a reverse hash lookup. Such a reverse hash lookup can be similar to the reverse hash lookups shown and described in U.S. patent application Ser. No. 12/981,025, filed Dec. 29, 2010 and entitled "Methods and Apparatus for Validation of Equal Cost Multi-Path (ECMP) Paths in a Switch Fabric System," the disclosure of which is incorporated herein by reference in its entirety.

The first switch is then configured to send the initialization packet to a second switch within a second stage of the switch fabric via the port based on the header value. For example, the first switch is configured to use the header value as an input to a hash function to produce a hash index associated with the port from the set of ports, such that the initialization packet is sent to the second switch via the port. Subsequently, the first switch is configured to receive an acknowledgement packet including the header value from the second switch in response to the second switch receiving the initialization packet. The first switch is configured to retrieve the header value from the acknowledgement packet such that the first switch defines, in response to the first switch receiving the acknowledgement packet, a response packet having the header value. Furthermore, the first switch is configured to process the response packet based on the header value by a processing pipeline included in the first switch, and then send the response packet to the second switch via the port based on the header value.

In some embodiments, the first switch is configured to define the initialization packet and the response packet such that the initialization packet and the response packet include the header value within a header portion of the initialization packet and the response packet. In contrast, the first switch is configured to receive the acknowledgement packet such that the acknowledgement packet includes the header value in a payload portion of the acknowledgement packet. In some embodiments, the second switch is from a set of second switches, and each port from the set of ports of the first switch is associated with a different second switch from the set of second switches. In some embodiments, the first switch is also configured to define a second initialization packet having a second header value associated with a second port from the set of ports. The first switch is configured to send the second initialization packet to a third switch via the second port based on the second header value.

In some embodiments, an apparatus includes a first switch within a stage of a distributed LAG-based multipath switch fabric. The first switch is configured to receive via a port of the first switch, from a second switch, an initialization packet associated with a LAG and having a header portion including a header value. The first switch is then configured to define an acknowledgement packet having a payload portion including the header value in response to receiving the initialization packet. The first switch is configured to send the acknowledgement packet to the second switch via the port of the first switch, such that the second switch defines a response packet having a header portion including the header value. Furthermore, the first switch is configured to receive the response packet based on the header portion of the response packet including the header value.

In some embodiments, the first switch is configured to receive the initialization packet and the response packet from a common port of the second switch based on both the header portion of the initialization packet and the header portion of the response packet including the header value. In some embodiments, the first switch is configured to define the acknowledgement packet having the payload portion including the header value such that the second switch can send the response packet via a common port as the initialization packet. In some embodiments, the second switch is associated with a stage of the switch fabric different than the stage associated with the first switch.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a data packet sent from a first device to a second device can include a destination address of a third device downstream from the second device. In such embodiments, because the second device is an intervening device between the first device and the third device, the data path between the first device and the third device can be said to include two physical hops. In some embodiments, there can be any number of physical hops between devices. In some embodiments, a second protocol can use the destination address of the first protocol to route a data packet from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a stage of the switch fabric can be included in a first chassis and another stage of the switch fabric can be included in a second chassis. Both of the stages can logically function as part of a single consolidated switch (e.g., within the same logical hop according to a first protocol) but include a separate single physical hop between respective pairs of stages within the consolidated switch. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIG. 2 refers to specific stages within a given multi-stage switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the first stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a LAG-based multipath switch fabric 100, according to an embodiment. As shown in FIG. 1, the switch fabric 100 includes switches 110, 120, 130 and 140, which are operatively coupled to each other. Specifically, port 112 of switch 110 is connected to port 122 of switch 120 by link 152; port 114 of switch 110 is connected to port 132 of switch 130 by link 154; port 124 of switch 120 is connected to port 142 of switch 140 by link 156; port 134 of switch 130 is connected to port 144 of switch 140 by link 158.

A switch within the switch fabric 100 (e.g., switch 110, 120, 130 and 140) can be any switching device that is used to redirect data (e.g., data packets, data cells, etc.) as it flows through the switch fabric 100. For example, switch 110, 120, 130 or 140 can be a packet switch, a frame switch, an integrated Ethernet switch and/or a cell switch, etc. In some embodiments, for example, each switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles), and for all output ports to read one outgoing cell or data packet per time period. Each switch operates similar to a crossbar switch that can be reconfigured in each time period. In some embodiments, a port of a switch can function as both an input port and an output port, depending on the direction of traffic going through the switch. For example, when switch 110 sends data packets to switch 140 through switch 120, port 112 of switch 110 functions as an output port; when switch 110 receives data packets from switch 140 through switch 120, port 112 functions as an input port.

In some embodiments, an upstream switch in the switch fabric 100 can have a LAG-based connectivity with multiple downstream neighboring switches. For example, switch 110 has a LAG-based connectivity with switch 120 and switch 130; switch 140 also has a LAG-based connectivity with switch 120 and switch 130. The LAG uses multiple ports of the upstream switch to increase the link speed beyond the limits of a single port of the upstream switch, thus to increase the redundancy for higher availability in transmitting data from and/or receiving data at the upstream switch. Additionally, a LAG load balancing mechanism (e.g., hashing based) can be used at the upstream switch to load balance traffic across different member links in the LAG.

In the example of FIG. 1, ports 112 and 114 are from a set of ports of switch 110 that is associated with a LAG between switch 110 and switch 140. The LAG is used to operatively couple switch 110 with switch 140 via multiple paths including a path through switch 120 and a path through switch 130. The multiple paths associated with the LAG that connect switch 110 and switch 140 are represented by link-group 162, which includes link 152 and link 154. Similarly, a set of ports of switch 140 including port 142 and port 144 is associated with the LAG, and the multiple paths associated with the LAG are represented by link-group 164, which includes link 156 and link 158. In some embodiments, although not shown in FIG. 1, the set of ports of switch 110 and/or the set of ports of switch 140 that are associated with the LAG include more than two ports, and accordingly, link-group 162 and/or link-group 164 that are associated with the LAG include more than two paths.

In some embodiments, the switch fabric 100 can be a distributed multi-stage switch. For example, switch 110 can be associated with a first stage of the switch fabric 100; switch 120 and switch 130 can be associated with a second stage of the switch fabric 100 that is adjacent to the first stage; and switch 140 can be associated with a third stage of the switch fabric 100 that is adjacent to the second stage. In some embodiments, each port of a set of ports of a switch, which is associated with a LAG for the switch, is associated with a different switch from a set of switches within a common stage. For example, port 112 and port 114 of switch 110 are connected to switch 120 and switch 130, respectively, which are both within the second stage of the switch fabric 100.

In some embodiments, a switch within the switch fabric 100 can be configured to establish a connectivity, or confirm bidirectional communication, with a neighboring switch by exchanging messages of certain types (e.g., control packets, hello protocol data units (PDU), etc.) between the switch and its neighboring switch. Particularly, a three-way handshake protocol can be used to establish a bidirectional connectivity between two neighboring switches. For example, as described in further detail with respect to FIGS. 5-8, switch 110 (or switch 140) can be configured to establish a bidirectional connectivity with switch 120 (or switch 130) by exchanging an initialization packet, an acknowledgement packet and a response packet between the two switches.

Figure 2:
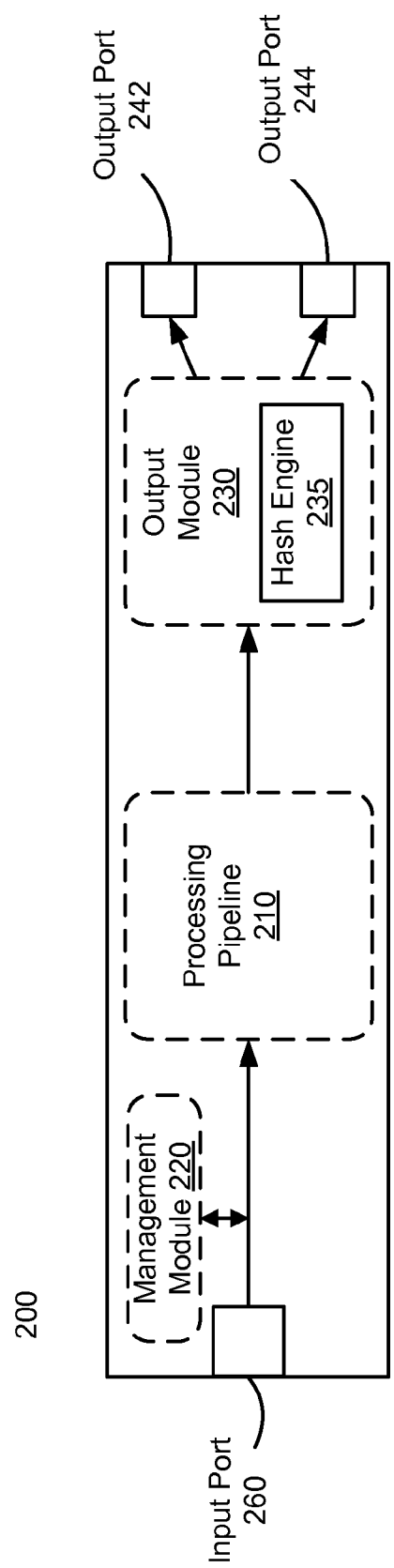
FIG. 2 is a schematic illustration of an upstream switch, according to an embodiment.

FIG. 2 is a schematic illustration of an upstream switch 200, according to an embodiment. Switch 200 can be structurally and functionally similar to switch 110 or 140 in FIG. 1. As shown in FIG. 2, switch 200 includes an input port 260, output ports 242 and 244, a management module 220, a processing pipeline 210 and an output module 230, which includes a hash engine 235. The input port 260 can be any port suitable to receive data packets from another switch of a stage, which is different from the stage in a switch fabric that includes switch 200, or another type of device such as an edge device, a peripheral processing device, etc. Similarly, the output port 242, 244 can be any port suitable to send data packets to another switch (e.g., a downstream switch) of a different stage in the switch fabric, or another type of device. Furthermore, output port 242 and output port 244 each is coupled to a different switch or device. Accordingly, the input port 260 and the output ports 242, 244 can operatively couple switch 200 associated with a stage of the switch fabric with another switch associated a different stage of the switch fabric, or another device. In some embodiments, although not shown in FIG. 2, an input port (e.g., input port 260) and an output port (e.g., output port 242, 244) can physically be a common port of switch 200. That is, a port of switch 200 can be configured to both receive data packets from and send data packets to another switch or another device coupled to switch 200 via the port.

Management module 220 can include a combination of hardware modules and software modules (executing or stored in hardware) that can be used to construct and/or process a packet for switch 200. In some embodiments, management module 220 can include a processor, a CPU, or the like. Particularly, management module 220 can be configured to construct a packet (e.g., an initialization packet, an acknowledgement packet, a response packet) that is used in the three-way handshake process to establish a bidirectional connectivity between switch 200 with another switch coupled to switch 200. To construct a packet, management module 220 can be configured to define a header value in a header portion of the packet. The header value can be further used in output module 230 to determine which output port to send the packet. In some embodiments, a portion of information (e.g., non-header information) used in output module 230 to determine which output port to send the packet can also be included in a payload portion of the packet, which is defined at management module 220. In some embodiments, management module 220 can be configured to construct a packet (e.g., an acknowledgement packet, a response packet) based on a packet received from a port (e.g., input port 260) of switch 200. Specifically, management module 220 can be configured to define a header value for the packet constructed at management module 220 based on a value or information retrieved from a header portion or a payload portion of the received packet. Furthermore, in some embodiments, management module 220 can be configured to include a first marker and/or identifier in a packet (e.g., an initialization packet, an acknowledgement packet, a response packet) constructed at management module 220. The first marker included in the packet can be used to, for example, identify that packet as a packet to be used in the three-way handshake process (i.e., a hello protocol packet).

After constructing a packet, management module 220 can be configured to send the packet to processing pipeline 210 for any further processing of the packet that may be performed. Processing pipeline 210 can include any suitable processor configured to receive and/or read packets from management module 220, process the packets, store the packets, and/or send the packets to output module 230. The packets processed by processing pipeline 210 include packets used for establishing a connection between switch 200 and another switch. Processing pipeline 210 can include a combination of hardware modules and software modules (executing or stored in hardware). For example, processing pipeline 210 can perform processing functions, such as, classification and flow control. In some embodiments, for example, processing pipeline 210 can include a field-programmable gate array (FPGA), an application specific integrated circuit (ASIC), a digital signal processor (DSP) and/or the like. Furthermore, in some embodiments, processing pipeline 210 can be configured to process the packet based on the header value included in the header portion of the packet. In some embodiments, processing pipeline 210 can be included in, or referred to as, an ingress pipeline of switch 200.

After processing a packet, processing pipeline 210 can be configured to send the packet to output module 230, which is configured to determine which output port to send the packet. As shown in FIG. 2, output module 230 can include a hash engine 235. Hash engine 235 can use the header value included in the header portion of the packet, and/or other parameters as input to a hash function to determine which output port to send the packet. Specifically, the hash function can produce a hash index based on the input including the header value and/or other parameters. The resulted hash index can then be mapped to one of a set of available output ports based on for example, a mapping table stored in a memory within output module 230. As a result, the packet can be sent to a downstream switch coupled to the selected output port of switch 200 via the selected output port. Thus, switch 200 completes the process of constructing a packet, processing the packet, and then sending the packet to a downstream switch via an output port.

In some embodiments, output module 230 can be included in, or referred to as, an egress pipeline of switch 200. In some embodiments, output module 230 can be configured to include a second marker and/or identifier (i.e., different from the first marker included in the packet at management module 220) in the packet before the packet is sent out to the downstream switch from switch 200. The second marker included in the packet can be used to, for example, indicate that the packet has been successfully processed by the ingress and egress pipeline (e.g., processing pipeline 210 and output module 230).

FIG. 3 is a schematic illustration of a downstream switch 300, according to an embodiment. Switch 300 can be structurally and functionally similar to switch 120 or 130 in FIG. 1. As shown in FIG. 3, switch 300 includes an input port 346, output ports 342 and 344, a processing pipeline 310, a filter module 320, a management module 330, and an output module 340. In some embodiments, although not shown in FIG. 2 and FIG. 3, an upstream switch (e.g., switch 200 in FIG. 2) and a downstream switch (e.g., switch 300 in FIG. 3) can have the same inner structure. Particularly, an upstream switch and a downstream switch can have modules (e.g., management module, output module, filter module) and pipelines (e.g., processing pipeline, ingress pipeline, egress pipeline) that are structurally and functionally similar.

Similar to the input port 260 in FIG. 2, the input port 346 can be any port suitable to receive data packets from another switch (e.g., an upstream switch) of a stage, which is different from the stage in a switch fabric that includes switch 300, or another type of device. Similar to the output port 242, 244 in FIG. 2, the output port 342, 344 can be any port suitable to send data packets to another switch (e.g., an upstream switch) of a different stage in the switch fabric, or another type of device. In some embodiments, although not shown in FIG. 3, an input port (e.g., input port 346) and an output port (e.g., output port 342, 344) of switch 300 can physically be a common port. That is, a port of switch 300 can be configured to both receive data packets from and send data packets to another switch (e.g., an upstream switch) or another device coupled to switch 300 via the port.

Similar to processing pipeline 210 in FIG. 2, processing pipeline 310 can include any suitable processor configured to receive, read, process, and/or store packets received from the input port 346. The packets processed by processing pipeline 310 can include packets used for establishing a connection between switch 300 and another switch (e.g., an upstream switch such as switch 200 in FIG. 2). Processing pipeline 310 can include a combination of hardware modules and software modules (executing or stored in hardware). For example, processing pipeline 310 can perform processing functions, such as, classification and flow control. In some embodiments, for example, processing pipeline 310 can include a FPGA, a ASIC, a DSP and/or the like. Furthermore, in some embodiments, processing pipeline 310 can be configured to process the packet based on the header value included in the header portion of the packet. In some embodiments, processing pipeline 310 can be included in, or referred to as, an ingress pipeline of switch 300.

After processing a packet received from the input port 346, processing pipeline 310 can be configured to send the packet to filter module 320. Filter module 320 can include a combination of hardware modules and software modules (executing or stored in hardware). Filter module 320 can be used to examine the received packet and determine where to send the packet. In some embodiments, filter module 320 can be configured to determine where to send the packet based on the marker(s) identified in the packet. For example, if filter module 320 identifies one or two markers associated with another switch (e.g., an upstream switch such as switch 200 in FIG. 2) in the packet, which indicates the packet is received from that switch and used in the three-way handshake process (i.e., a hello protocol packet) between switch 300 and that switch, filter module 320 can be configured to send the packet to management module 330. If filter module 320 identifies one marker associated with switch 300 in the packet, which indicates the packet is constructed within switch 300 (e.g., at management module 330) and used in the three-way handshake process between switch 300 and another switch, filter module 320 can be configured to send the packet to output module 340. If filter module 320 determines the packet is not associated with the three-way handshake process (e.g., no corresponding marker is included in the packet), filter module 320 can be configured to send the packet to an appropriate component or module of switch 300 accordingly. In some embodiments, filter module 320 can be included in the ingress pipeline of switch 300.

After a packet is received at management module 330 from filter module 320, management module 330 can be configured to construct a packet (e.g., an acknowledgement packet, a response packet) in response to the received packet, as described in detail herein. Similar to management module 220 in FIG. 2, management module 330 can include a combination of hardware modules and software modules (executing or stored in hardware) that can be used to construct and/or process a packet for switch 300. In some embodiments, management module 330 can include a processor, a CPU, or the like. Particularly, management module 330 can be configured to construct an acknowledgement packet in response to receiving an initialization packet sent from another switch (e.g., an upstream switch), or construct a response packet in response to receiving an acknowledgement packet sent from another switch. In some embodiments, management module 330 can be configured to construct a packet (e.g., an acknowledgement packet, a response packet) based on the packet (e.g., an initialization packet) received from another switch. Specifically, as described with respect to FIGS. 5-8, management module 330 can be configured to define a header value for the packet constructed at management module 330 based on a value or information retrieved from a header portion or a payload portion of the received packet. Furthermore, in some embodiments, management module 330 can be configured to include a first marker in a packet constructed at management module 330. The first marker included in the packet can be used to, for example, identify that packet as a packet to be used in the three-way handshake process (i.e., a hello protocol packet).

After management module 330 constructs a new packet in response to the received packet, management module 330 can be configured to insert the new packet before or after processing pipeline 310, as shown in FIG. 3. As a result, the new packet is sent to filter module 320, via or not via processing pipeline 310. Because the new packet includes only one marker (i.e., defined at management module 330), the new packet is sent from filter module 320 to output module 340 instead of management module 330. In some embodiments, because switch 300 does not have a LAG-based connectivity with multiple upstream switches, no hash function is applicable at output module 340 to determine to which output port to send the packet. In some embodiments, processing pipeline 310 can be configured to determine which output port to send the packet. In such embodiments, the new packet is inserted before processing pipeline 310 by management module 330. Based on the determination made at processing pipeline 310, the packet can be sent to a corresponding upstream switch via an output port (e.g., output port 342, 344) coupled to the upstream switch. Furthermore, in some embodiments, the output port via which the packet is sent to the upstream switch can be the same physical port as the input port (e.g., input port 346) from which a packet is previously received from that upstream switch. Thus, switch 300 completes the process of receiving a packet from an upstream switch, processing the packet, constructing a new packet in response to the received packet, and then sending the new packet back to the upstream switch via an output port.

In some embodiments, although not used in the scenario described above and not shown in FIG. 3, a hash engine (like hash engine 235 shown in FIG. 2) can be included in output module 340. In some embodiments, output module 340 can be included in, or referred to as, an egress pipeline of switch 300. In some embodiments, output module 340 can be configured to include a second marker (e.g., different from the first marker included in the packet at management module 330) in the packet before the packet is sent to the upstream switch from switch 300. The second marker included in the packet can be used to, for example, indicate that the packet has been successfully processed by the ingress and egress pipeline (e.g., processing pipeline 310, filter module 320, and/or output module 340).

In some embodiments, switch 200 and switch 300 can complete a three-way handshake process to validate bidirectional connectivity between switch 200 and switch 300. Specifically, switch 200 and switch 300 can be configured to construct, process, send, and/or receive packets, including initialization packets, acknowledgement packets and response packets, which are associated the three-way handshake protocol. To initiate the handshake process with switch 300, management module 220 of switch 200 can be configured to originate an initialization packet. Particularly, as further described with respect to FIG. 4, management module 220 can be configured to define a header value in a header portion of the initialization packet, such that the initialization packet can be sent, via a specific port, to switch 300 that is coupled to switch 200 via the specific port. Additionally, management module 220 can be configured to include a first marker in the initialization packet. The initialization packet is sent from management module 220 to processing pipeline 210 for any appropriate processing, and then sent to output module 230. At output module 230, hash engine 235 uses the header value retrieved from the header portion of the initialization packet as an input to a hash function to produce an index value, which is used to determine the specific output port from a set of output ports (e.g., output port 242, 244). Additionally, output module 230 can be configured to include a second marker in the initialization packet. Consequently, the initialization packet is sent to switch 300 via the selected output port.

After receiving the initialization packet from switch 200 via the input port 346, processing pipeline 310 of switch 300 can be configured to process the received initialization packet, and then send the initialization packet to filter module 320. As described herein, filter module 320 can determine to send the initialization packet to management module 330 based on the two markers included in the initialization packet. Subsequently, management module 330 can be configured to construct an acknowledgement packet based on the received initialization packet. Particularly, as further described with respect to FIG. 7, management module 330 can be configured to include the header value retrieved from a header portion of the received initialization packet in, for example, a payload portion of the acknowledgement packet. The header value was used to determine a port of switch 200 to send the initialization packet at switch 200. Additionally, management module 330 can be configured to include a first marker in the acknowledgement packet. The acknowledgement packet is then sent from management module 330 to the ingress pipeline (e.g., before or after processing pipeline 310) of switch 300 for any appropriate processing. Subsequently, the acknowledgement packet can be sent to output module 340.

In some embodiments, output module 340 can be configured to send the acknowledgement packet to switch 200 via an output port (e.g., output port 342 or output port 344) coupled to switch 200 without using any hash function on the acknowledgement packet. In some embodiments, although not shown in FIG. 3, the output port and the input port of switch 300 from which the initialization packet was received can be a common physical port of switch 300. Alternatively, the acknowledgement packet can be sent by output module 340 to switch 200, via a port determined by a hash engine (similar to hash engine 235 in FIG. 2, not shown in FIG. 3) included in output module 340 based on a header value in a header portion of the acknowledgement packet. In this case, management module 330 can be configured to define the header value in the header portion of the acknowledgement packet such that the port selected by the hash engine included in output module 340 based on the header value is the port from which the initialization packet was received. Thus, the acknowledgement packet can be sent, via the port from which the initialization packet was received at switch 300, to switch 200 which sent the initialization packet to switch 300. Note that in this case the physical port of switch 300 can function as both an input port and an output port, thus the acknowledgement packet can be sent from switch 300 via the same physical port from which the initialization packet was received at switch 300. Additionally, output module 340 can be configured to include a second marker in the acknowledgement packet before the acknowledgement packet is sent out of switch 300.

After receiving the acknowledgement packet from switch 300, switch 200 can be configured to process the acknowledgement packet, construct a response packet in response to the acknowledgement packet, and then send the response packet to switch 300. Switch 200 can complete the process in a similar way to switch 300 sending the acknowledgement packet to switch 200 in response to the initialization packet received from switch 200. Particularly, management module 220 can be configured to construct the response packet based on the received acknowledgement packet. As further described with respect to FIG. 8, management module 220 can be configured to retrieve a header value included in, for example, a payload portion of the received acknowledgement packet, and then include the retrieved header value in a header portion of the response packet. Furthermore, similar to sending the initialization packet, hash engine 235 uses the header value retrieved from the header portion of the response packet as an input to a hash function to produce an index value, which is used to determine an output port from a set of output ports (e.g., output port 242, 244). As a result, the response packet is sent out of switch 200 via the selected output port. In some embodiments, the output port selected to send the response packet is the same port from which the acknowledgement packet was received. Furthermore, the output port selected to send the response packet is also the same port from which the initialization packet, based on which the received acknowledgement packet was constructed at switch 300, was sent out of switch 200. Thus, the response packet is sent to switch 300, and the three-handshake process is completed by switch 200 and switch 300. Details of the three-way handshake process and the packets used in the process are described with respect to FIGS. 5-8.

Although switch 200 (e.g., an upstream switch) and switch 300 (e.g., a downstream switch) have different internal structures and components as shown and described with respect to FIGS. 2-3, in some embodiments, an upstream switch and a downstream switch can have the same internal structure and components. For example, switch 200 can include a filter module like filter module 320 in FIG. 3. For another example, output module 340 of switch 300 can include a hash engine like hash engine 235 in FIG. 2. Furthermore, in some embodiments, a switch can function as both an upstream switch and a downstream switch. For example, the switch can function as an upstream switch when the switch communicates with a first switch, and function as a downstream switch when the switch communicates with a second switch. In such embodiments, the switch can function similar to switch 200 as described with respect to FIG. 2 when the switch functions as an upstream switch; and function similar to switch 300 as described with respect to FIG. 3 when the switch functions as a downstream switch.

In some embodiments, a hop-by-hop hello protocol based on the three-way handshake process between two neighboring switches as described herein can be used to provide an overall operations, administration and maintenance (OAM) solution for a LAG-based multipath switch fabric. Particularly, the three-way handshake process described herein can be used to enable bidirectional validation of forwarding state between two neighboring switches, and to validate the pipelines (e.g., ingress pipelines, egress pipelines) of the respective neighboring switches. The packets (e.g., initialization packets, acknowledgement packets, response packets) used between two neighboring switches for the three-way handshake protocol can be used to indicate and/or validate a forwarding state between the two neighboring switches. Specifically, if a fault occurs in any pipeline (e.g., an ingress pipeline, an egress pipeline) at any of the two switches, a packet in the transmission can be dropped, thus the three-way handshake process can break down.

In the example of FIGS. 2-3, if there is a fault in processing pipeline 210 of switch 200 when an initialization packet is processed at processing pipeline 210, the initialization packet can be dropped. For another example, if there is a fault in output module 340 of switch 300 when an acknowledgement packet is processed at output module 340, the acknowledgement packet can be dropped. Consequently, the three-way handshake between switch 200 and switch 300 can provide an indication of an error in the connection between the switch 200 and the switch 300.

Such a fault within a pipeline at a switch can be detected by one or two of the neighboring switches based on the drop of a packet in the transmission. In some embodiments, for example, a timeout mechanism can be implemented for a packet (e.g., an initialization packet, an acknowledgement packet, a response packet) to detect a drop of the packet and/or a fault within a switch that causes the drop of the packet. In such embodiments, if the packet is not sent from or received at a switch within a certain time period, the switch can determine that the packet has been dropped in the process. Thus, the forwarding state of the corresponding switch(es) can be determined.

Consequently, as a part of processing of the packets used for the three-handshake protocol by the two neighboring switches, the complete pipeline (e.g., including an ingress pipeline and an egress pipeline) on both switches can be validated, and the forwarding state of the switches can be determined. As such, by implementing the three-way handshake protocol between each pair of neighboring switches, each switch in the multipath switch fabric can become aware of the forwarding state of its immediate-neighboring switches. Furthermore, the forwarding state of each switch can be aggregated, for example, by a separate control plane layer of the multipath switch fabric. Thus, an overall forwarding state of the multipath switch fabric can be obtained in terms of distinct hops across immediate-neighboring switches in the multipath switch fabric. In such a way, a complete multipath forwarding state in can be obtained, as an overall OAM solution, for the multipath switch fabric.

In some embodiments, a switch (e.g., switch 200, switch 300) can be configured to define a hash value based on a header value included in a header portion of an initialization packet. The hash value can be used to send the initialization packet via an output port of the switch, based on a reverse hash lookup table. FIG. 4 is a schematic illustration of such a reverse hash lookup table 400 that is implemented in a switch, according to an embodiment. The switch that hosts reverse hash lookup table 400 can be a switch structurally and functionally similar to switch 200 in FIG. 2 or switch 300 in FIG.

3. In some embodiments, reverse hash lookup table 400 can be stored in a memory and maintained by a processor (e.g., a control CPU) within the switch. Furthermore, reverse hash lookup table 400 can be accessible to a management module (e.g., management module 220, management module 330) of the switch, such that the management module of the switch can construct a packet (e.g., an initialization packet) based on information retrieved from reverse hash lookup table 400.

As shown in FIG. 4, the first column of reverse hash lookup table 400, port number 410, contains port indexes (e.g., 242, 244), each of which uniquely identifies an output port of the switch hosting reverse hash lookup table 400 (e.g., switch 200 in FIG. 2). Alternatively, the column 410 can contain values in other forms (e.g., a hash index), each of which uniquely identifies an output port of the switch. The second column of reverse hash lookup table 400, header value 420, contains combinations of one or more header values (e.g., "H1, H2", "H3"), each of which represents one or more header values that can be potentially included in an initialization packet defined at the switch hosting reverse hash lookup table 400, and used to determine a port of the switch to send the initialization packet. Additionally, in some embodiments, the column of header value 420 can include values of any additional non-header parameters in any suitable form that can be potentially used as inputs in the hashing function. Note that, in some embodiments, a port can be associated with one or more header values and, in some embodiments, a header value can be used to determine a single port.

Each header value can be a single value or a combination of multiple fields defined in the header portion of an initialization packet. For example, the header value can be a single-digit integer from 0 to 9 that is defined as a field in the header portion specifically for determining an output port to send the initialization packet. For another example, the header value can be a combination of the fields representing an identifier, a sequence number, and/or an address (e.g., MAC address, IP address) of the switch. In any case, the header value can be a valid input to, for example, a hash function that is used in an output module (e.g., output module 230) of the switch to determine a port to send the initialization packet. Reverse hash lookup table 400 is essentially a reverse engineered version of the hash function in the output module. Specifically, given a specific port number (or a hash index) associated with an output port, reverse hash lookup table 400 can be used to determine a set of one or more header value(s), which are used in one or more field(s) in a header portion of the initialization packet. As a result, when the initialization packet is processed at the output module, the hash function in the output module can map the header value(s) and/or any other associated values to the same specific port number (or hash index), or obtain the hash index for the same specific port number from calculation based on the header value(s) and/or any other associated values. Thus, the output port identified by the port number (or hash index) can be determined to send the initialization packet.

Said in another way, each entry in reverse hash lookup table 400 maps a given port number 410 to a specific header value 420, which can be a combination of one or more header values or optionally additional non-header parameters. Specifically, the mapping between a port number 410 and a header value 420 is based on the hash function that is used to determine an output port to send a packet. That is, a port number 410 is mapped to a header value 420 containing one or more header values in reverse hash lookup table 400 where the port identified by the port number 410 will be selected by the hash function based on the header value being used as an input to the hash function. Thus, an initialization packet that includes any header value contained in the header value 420 will be deterministically sent from the port identified by the port number 410. In the example of FIGS. 2-4, port number 242 is mapped to header value H1 and H2 in reverse hash lookup table 400, which results in an initialization packet originated at switch 200 that includes header value H1 or H2 being deterministically sent from output port 242 of switch 200. Similarly, port number 244 is mapped to header value H3 in reverse hash lookup table 400, which results in an initialization packet originated at switch 200 that includes header value H3 being deterministically sent from output port 244 of switch 200.

In some embodiments, a switch (e.g., switch 200 in FIG. 2) that hosts reverse hash lookup table 400 can originate an initialization packet to be sent to a desired destination switch (e.g., switch 300 in FIG. 3) by assigning a specific header value to the initialization packet using reverse hash lookup table 400. Specifically, to initiate a handshake process with a desired switch, the initiating switch can determine a port number of a specific output port coupled to the desired switch. Subsequently, the initiating switch can be configured to determine a header value that is mapped from the port number based on reverse hash lookup table 400, and then assign that header value to an initialization packet originated in the initiating switch. As a result, the initialization packet will be sent to the desired switch via the specific output port from the initiating switch.

For example, when switch 200 initiates a handshake process with switch 300 that is coupled to switch 200 via output port 244, switch 200 first determines port number 244 in reverse hash lookup table 400 for output port 244, and then determines header value H3 that is mapped from port number 244 in reverse hash lookup table 400. Subsequently, header value H3 is assigned into a header portion of an initialization packet that is originated by management module 220. After going through processing pipeline 210, the initialization packet is sent to output module 230, where hash engine 235 produces a hash index associated with port number 244 by using header value H3 as an input to a hash function. As a result, the initialization packet is sent out of switch 200 from output port 244. Consequently, the initialization packet is sent to switch 300.

Figure 5:
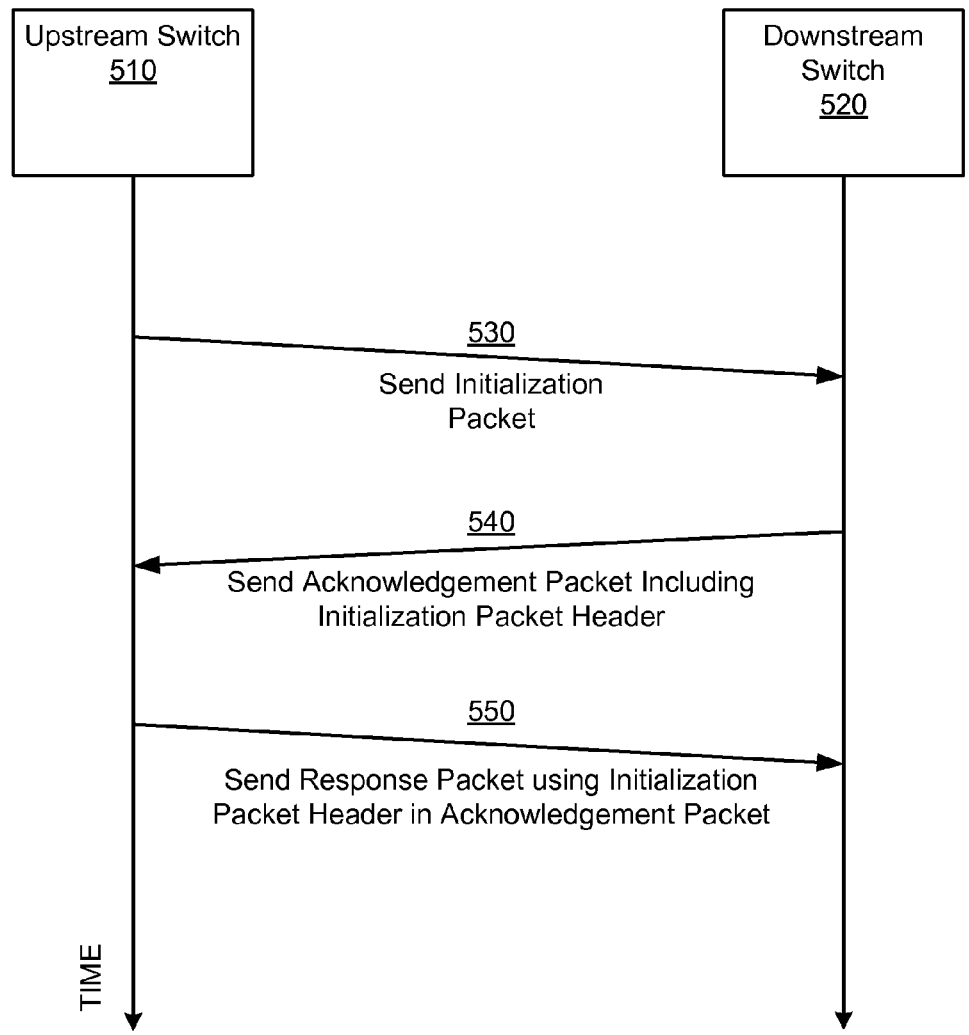
FIG. 5 is a logical representation of two switches establishing a connection based on a handshake protocol, according to an embodiment.

FIG. 5 is a logical representation of two switches establishing a connection based on a handshake protocol, according to an embodiment. Upstream switch 510 and downstream switch 520 are two directly coupled switches in a multi-stage switch fabric; switch 510 and switch 520 can be structurally and functionally similar to switch 200 in FIG. 2, and switch 300 in FIG. 3, respectively. Upstream switch 510 is associated with a stage in the multi-stage switch fabric, and downstream switch 520 is associated with a different stage in the multi-stage switch fabric, which is adjacent to the stage of upstream switch 510. In some embodiments, although not shown in FIG. 5, upstream switch 510 is coupled to multiple downstream neighbor switches, including downstream switch 520, via a LAG-based multipath connectivity. That is, upstream switch 510 is similar to switch 110 or switch 140 in FIG. 1, which is connected to switch 120 and switch 130 via link-group 162 or link-group 164. Downstream switch 520 is similar to switch 120 or switch 130 in FIG. 1, which is connected to only one upstream switch (e.g., switch 110, switch 140) associated with a specific adjacent stage.

As shown in FIG. 5, upstream switch 510 initiates a handshake process by sending an initialization packet to downstream switch 520, shown as signal 530 in FIG. 5. Specifically, upstream switch 510 is configured to originate an initialization packet that includes a header value in a header portion of the initialization packet. Each valid header value that can potentially be used by upstream switch 510 is associated with a port number identifying a port of upstream switch 510 in a reverse hash lookup table (e.g., reverse hash lookup table 400 in FIG. 4). Thus, a specific header value, which is associated with a given port number identifying the port of upstream switch 510 coupled to downstream switch 520, can be determined from the reverse hash lookup table. Upstream switch 510 then includes the specific header value in the header portion of the initialization packet. As a result, the initialization packet is sent to downstream switch 520 via the port of upstream switch 510 coupled to downstream switch 520, where the port number of the port is determined by for example, a hash function based on the specific header value.

In the example of FIG. 1, switch 110 can initiate a handshake process with switch 120 by sending an initialization packet to switch 120 via port 112. Specifically, switch 110 is configured to determine a specific header value, which is associated with the port number of port 112, based on a reverse hash lookup table stored in switch 110. The specific header value is then included in a header portion of the initialization packet that is originated at switch 110. To send the initialization packet to a downstream switch (e.g., switch 120, switch 130) through LAG-based link-group 162, the hashing mechanism described herein is used at switch 110. As a result, port 112 is selected by, for example, a hash engine within an output module in switch 110, based on the specific header value included in the initialization packet. Thus, the initialization packet is sent out of switch 110 from port 112, to further reach switch 120 over link 152.

Similarly, switch 110 can initiate a handshake process with switch 130 by sending a second initialization packet to switch 130 via port 114. Specifically, switch 110 can be configured to originate the second initialization packet having a second header value associated with port 114, and then send the second initialization packet out of switch 110 from port 114, thus to reach switch 130 over link 154. Furthermore, in some embodiments, switch 140 can originate an initialization packet and send the initialization packet to switch 120 or switch 130 via port 142 or port 144, respectively, in a similar way.

Figure 6:
FIG. 6 is a block diagram of the structure of an initialization packet, according to an embodiment.

FIG. 6 is a block diagram of the structure of an initialization packet 600, according to an embodiment. Initialization packet 600 includes a header portion 610 and a payload portion 620, both defined by a first switch that originates initialization packet 600. The first switch is also configured to include a header value within header 610 for sending initialization packet 600. That is, the header value can be used, for example, as an input to a hash engine in the first switch, to determine a port of the first switch to send initialization packet 600. As described herein, the first switch can select a specific header value for initialization packet 600, such that initialization packet 600 can be sent to a desired second switch via a specific port of the first switch that is associated with the specific header value. In some embodiments, a port number identifying a port of the first switch is mapped to one or more header values in a reverse hash lookup table stored in the first switch, such as reverse hash lookup table 400 in FIG. 4.

Additionally, in some embodiments, header 610 and/or payload 620 also contains information associated with initiating a handshake process with the second switch, such as an identifier, a sequence number, or an address (e.g., MAC address, IP address) of the first switch, a flag identifying the nature of initialization packet 600 (e.g., as an initialization packet, as opposed to an acknowledgement packet or a response packet), and/or other information associated with establishing a communication session between the two switches, etc. As a result, based on the information of the first switch included in initialization packet 600, the second switch that receives initialization packet 600 can determine the identity of the first switch. For example, payload 620 can include a unique ID of the first switch as a source ID. Thus, the second switch that receives initialization packet 600 can determine the identity of the first switch based on the source ID included in payload 620.

Returning to FIG. 5, in response to receiving the initialization packet from upstream switch 510, downstream switch 520 is configured to reply with an acknowledgement packet to upstream switch 510, shown as signal 540 in FIG. 5. After receiving the initialization packet, downstream switch 520 is configured to construct the acknowledgement packet based on the received initialization packet. Specifically, downstream switch 520 is configured to include in the acknowledgement packet the header value, which was included in the header portion of the initialization packet. In some embodiments, the header value is retrieved from the header portion of the initialization packet and then included in the acknowledgement packet. In some other embodiments, the whole or a portion of the header portion including the header value is included in the acknowledgement packet; thus, the header value is included within the acknowledgement packet. In some embodiments, the header value is included in a payload portion of the acknowledgement packet. In some other embodiments, the header value is included in a header portion of the acknowledgement packet. The specific pattern of including the header value in the acknowledgement packet can be varied, depending on the specific handshake protocol implemented by the two switches (e.g., upstream switch 510 and downstream switch 520).

After the acknowledgement packet is constructed at downstream switch 520, downstream switch 520 can be configured to send the acknowledgement packet to upstream switch 510 via the same port of downstream switch 520 from which the initialization packet from upstream switch 510 was received. This port is a port that couples upstream switch 510 to downstream switch 520. Note in this example that it is assumed downstream switch 520 is connected to one or more upstream switch(es) including upstream switch 510, but not through any LAG-based multipath connectivity. As a result, downstream switch 520 does not use any LAG hashing mechanism to determine a port when sending a packet to an upstream switch. Thus, downstream switch 520 can send the acknowledgement packet via the same port from which the initialization packet from upstream 510 was received previously.

In the example of FIG. 1, in response to receiving the initialization packet from switch 110 via port 122, switch 120 can be configured to construct an acknowledgement packet based on the received initialization packet, and then send the acknowledgement packet to switch 110 via port 122. Specifically, switch 120 can be configured to retrieve the header value included in the header portion of the initialization packet, and then include the header value in, for example, a payload portion of the acknowledgement packet. Furthermore, switch 120 is configured to send out the acknowledgement packet via port 122, from which the initialization packet was received previously, thus to reach switch 110 over link 152. In a similar way, switch 120 or switch 130 can reply with an acknowledgement packet to switch 140 in response to receiving an initialization packet from switch 140.

Figure 7:
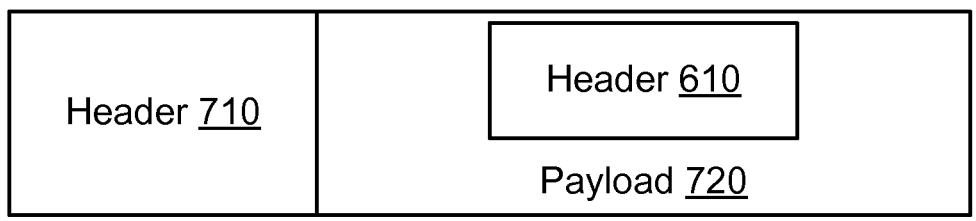
FIG. 7 is a block diagram of the structure of an acknowledgement packet, according to an embodiment.

FIG. 7 is a block diagram of the structure of an acknowledgement packet 700, which is constructed based on initialization packet 600 shown in FIG. 6, according to an embodiment. Constructed by the second switch in response to receiving initialization packet 600 from the first switch, acknowledgement packet 700 includes a header portion 710 and a payload portion 720, which includes the header portion 610 of initialization packet 600. Particularly, the header value used for sending initialization packet 600 contained in header 610 is included in payload 720 of acknowledgement packet 700. As shown in FIG. 7, header 610 can be completely included in payload 720. Alternatively, the header value can be retrieved from header 610 of initialization packet 600 and then included in payload 720 as a single value or field. In some other embodiments, header 610 or the header value can be included in a header potion of acknowledgement packet 700, such as header 710. Furthermore, in some embodiments, the header value or header 610 can be encapsulated according to a protocol within a payload portion or a header portion of acknowledgement packet 700. In such embodiments, the first switch that is to receive acknowledgement packet 700 is able to decapsulate the header value or header 610 according to the protocol to retrieve the header value. In some embodiments, acknowledge packet 700 can also include part of the payload 620 of the initialization packet 600.

Additionally, similar to initialization packet 600, header 710 and/or payload 720 also contains information associated with the handshake process between the first switch and the second switch, such as an identifier, a sequence number, or an address (e.g., MAC address, IP address) of the second switch, a flag identifying the nature of acknowledgement packet 700 (e.g., as an acknowledgement packet to initialization packet 600, as opposed to an initialization packet or a response packet), an identifier of initialization packet 600, and/or other information associated with establishing a communication session between the two switches, etc. As a result, based on the information included in acknowledgement packet 700, the first switch that receives acknowledgement packet 700 can confirm the successful receipt of initialization packet 600 at the second switch, and also confirm the identity of the second switch. For example, acknowledgement packet 700 can include the source ID of the first switch, which is retrieved from payload 620, as well as a unique ID of the second switch as a responder ID.

Returning to FIG. 5, in response to receiving the acknowledgement packet from downstream switch 520, upstream switch 510 is configured to respond with a response packet to downstream switch 520, shown as signal 550 in FIG. 5. After receiving the acknowledgement packet, upstream switch 510 is configured to construct the response packet based on the received acknowledgement packet. Specifically, upstream switch 510 is configured to retrieve the header value of the original initialization packet, based on which the acknowledgement packet was constructed at downstream switch 520, from a payload portion of the acknowledgement packet. In some embodiments, the header value needs to be retrieved from a portion other than the payload portion, such as a header portion of the acknowledgement packet. In some embodiments, upstream switch 510 needs to decapsulate a portion of the acknowledgement packet to retrieve the header value. Next, upstream switch 510 is configured to construct the response packet based on the header value and optionally other information retrieved from the acknowledgement packet. In particular, upstream switch 510 includes the retrieved header value in a header portion of the response packet, similar to the original initialization packet.

After the response packet is constructed at upstream switch 510, upstream switch 510 is configured to send out the response packet, potentially, to the switch from which the acknowledgement was received (i.e., downstream switch 520). Specifically, after being processed at a processing pipeline (e.g., processing pipeline 210 in FIG. 2), the response packet (shown as signal 550 in FIG. 5) is sent to and processed at an output module (e.g., output module 230 in FIG. 2) within upstream switch 510. As a result of processing the response packet in the output module, a port of upstream switch 510 to which to send the response packet is determined based on the header value included in the header portion of the response packet, which is used for example, as an input to a hash function in the output module. In other words, the response packet is processed in the output module in the same way as the initialization packet was processed. Because the header value used in the response packet is exactly the same as the one used in the initialization packet, the port determined by the output module for the response packet is exactly the same as the one determined for the initialization packet. As a result, the response packet is sent out of upstream switch 510 via the same port as the initialization packet, thus to reach downstream switch 520 in the same way as the initialization packet (shown as signal 530 for the initialization packet and signal 550 for the response packet). The three-way handshake process between upstream switch 510 and downstream switch 520 is thus completed.

In the example of FIG. 1, in response to receiving the acknowledgement packet from switch 120 via port 112, switch 110 can be configured to construct a response packet based on the received acknowledgement packet, and then send the response packet to switch 120 via port 112. Specifically, switch 110 can be configured to retrieve the header value of the original initialization packet from the acknowledgement packet, and then include the header value in a header portion of the response packet, similar to the original initialization packet. To send the response packet to a downstream switch (e.g., switch 120, switch 130) through LAG-based link-group 162, the hashing mechanism applied on the original initialization packet is again applied on the response packet at switch 110. For example, a port of switch 110 is determined to send the response packet by a hash function that takes the header value of the response packet as an input. Because the header value for the response packet is the same as the one for the original initialization packet, the outcome of the hash function for the response packet is the same as that for the original initialization packet. That is, port 112 is selected to send the response packet. Thus, the response packet is sent out of switch 110 from port 112, to further reach switch 120 over link 152. Therefore, the three-way handshake process between switch 110 and switch 120 is completed. In a similar way, switch 140 can construct and send a response packet to switch 120 or switch 130 in response to receiving an acknowledgement packet from switch 120 or switch 130.

Figure 8:
FIG. 8 is a block diagram of the structure of a response packet, according to an embodiment.

FIG. 8 is a block diagram of the structure of a response packet 800, which is constructed based on acknowledgement packet 700 shown in FIG. 7, according to an embodiment. As described with respect to FIGS. 6-7, the first switch originates and sends initialization packet 600 to the second switch, which then constructs and sends acknowledgement packet 700 to the first switch in response to receiving initialization packet 600 from the first switch. Subsequently, the first switch constructs response packet 800 based on the received acknowledgement packet 700 and then sends response packet 800 to the second switch. As shown in FIG. 8, response packet 800 includes a payload portion 820 and a header portion that is the same as header 610, which is the header portion for initialization packet 600. Specifically, to construct response packet 800, the first switch retrieves header 610 from payload 720 or a different portion of acknowledgement packet 700, and then uses header 610 as the header for response packet

800. Alternatively, the first switch can retrieve the header value of initialization packet 600 from a portion of acknowledgement packet 700, and then include the header value in a header portion of response packet 800. Either way, response packet 800 contains the same header value in a header portion as the header value included in the header portion of initialization packet 600. As a result, the port selected by the first switch to send response packet 800 based on the header value is the same as the port selected by the first switch to send initialization packet 600 based on the same header value. Thus, response packet 800 is sent from the first switch to the second switch in a similar way to sending initialization packet 600 from the first switch to the second switch.

Additionally, similar to initialization packet 600 and acknowledgement packet 700, header 610 and/or payload 820 of response packet 800 also contains information associated with the handshake process between the first switch and the second switch, such as the identifier, sequence number, or address (e.g., MAC address, IP address) of the first switch, a flag identifying the nature of response packet 800 (e.g., as a response packet to acknowledgement packet 700, as opposed to an initialization packet or an acknowledgement packet), an identifier of acknowledgement packet 700, and/or other information associated with establishing a communication session between the two switches, etc. As a result, based on the information included in response packet 800, the second switch that receives response packet 800 can confirm the successful receipt of acknowledgement packet 700, which is a reply to initialization packet 600, at the first switch. Thus, the three-way handshake process is completed, and the first switch and the second switch have successfully established a bidirectional connectivity between the two switches.

For example, the first switch can be configured to examine acknowledgement packet 700 received from the second switch. If the first switch determines that the acknowledgement packet 700 has valid values for the source ID (i.e., a unique ID for the first switch) and the responder ID (i.e., a unique ID for the second switch), the first switch can be configured to include both the source ID and the responder ID in response packet 800. Otherwise, if the first switch determines that the acknowledgement packet 700 does not have a valid value for the source ID and/or the responder ID in acknowledgement packet 700, the first switch can assume a fault in the three-way handshake process.

Similarly stated, if an upstream switch determines that an acknowledgement packet received from a downstream switch has a valid value for the "Source ID" field and a valid value for the "Responder ID" field, the upstream switch includes both the source ID and the responder ID in a final response packet, and then sends the response packet to the downstream switch. Otherwise, the upstream switch assumes a fault in the three-way handshake. In response to receiving the response packet, the downstream switch verifies that the value in the "Responder ID" field of the response packet is the responder ID included in the acknowledgement packet previously sent from the downstream switch. The downstream switch also verifies that the value in the "Source ID" field of the response packet is the source ID included in that acknowledgement packet. If these conditions are true, the three-way handshake is marked as successful. In some embodiments, other identifiers (i.e., other than source ID and responder ID) can also be included in an initialization packet, an acknowledgement packet, and/or a response packet. For example, an identifier associated with a LAG or a port of an upstream switch can be included in a packet, such that a switch can determine through which port, or which LAG, the packet is transmitted from a switch to another switch.

In some embodiments, a switch of a multi-stage switch fabric has a non-transitory processor-readable medium that stores code representing instructions to be executed by a processor of the switch, and the code comprises code to cause the processor of the switch to perform a series of operations as described in detail herein. In some embodiments, the switch can be an upstream switch connected to multiple downstream switches through a LAG-based multipath connectivity via a set of ports. In such embodiments, the code can cause the processor of the switch to, among other operations, define an initialization packet having a header value associated with a port from the set of ports; send the initialization packet to a downstream switch via the port based on the header value; receive from the downstream switch an acknowledgement packet including the header value; define, in response to receiving the acknowledgement packet, a response packet including the header value; send, based on the header value included in the response packet, the response packet to the downstream switch via the port, etc.

Figure 9:
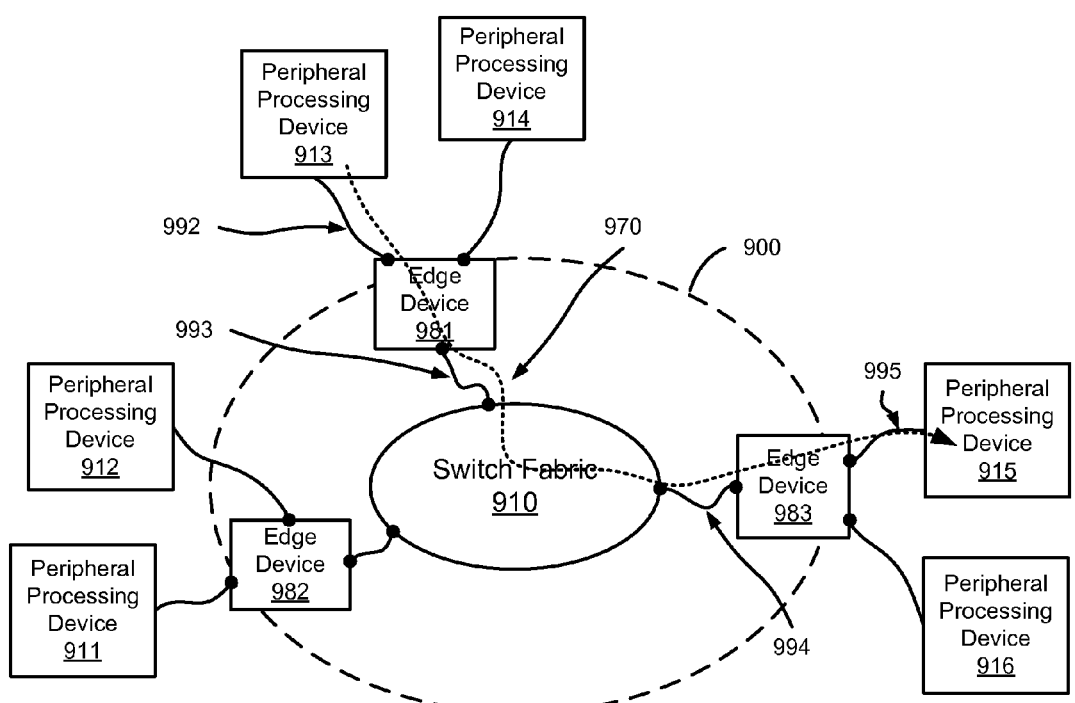
FIG. 9 is a schematic illustration of a switch fabric configured to send data packets from a source device to a destination device, according to an embodiment.

FIG. 9 is a schematic illustration of a switch fabric 900 configured to send data packets from a source device to a destination device, according to an embodiment. The switch fabric 900 includes a switch fabric 9910 and multiple edge devices (e.g., edge devices 981-983). The switch fabric 900 operatively couples multiple peripheral processing devices (e.g., peripheral processing devices 911-916) to each other. The peripheral processing devices 911-916 can be, for example, compute nodes, service nodes, routers, and storage nodes, etc. In some embodiments, for example, the peripheral processing devices 911-916 include servers, storage devices, gateways, workstations, and/or the like.

The peripheral processing devices 911-916 can be operatively coupled to the edge devices 981-983 of the switch fabric 900 using any suitable connection such as, for example, an optical connection (e.g., an optical cable and optical connectors), an electrical connection (e.g., an electrical cable and electrical connectors) and/or the like. As such, the peripheral processing devices 911-916 are configured to send data (e.g., data packets) to the switch fabric 900 via the edge devices 981-983. In some embodiments, the connection between a peripheral processing device 911-916 and an edge device 981-983 is a direct link. Such a link can be said to be a single physical hop link. In other embodiments, the peripheral processing devices can be operatively coupled to the edge devices via intermediary modules. Such a connection can be said to be a multiple physical hop link.

Each edge device 981, 982, 983 can be any device configured to operatively couple peripheral processing devices 911-916 to the switch fabric 910. In some embodiments, for example, the edge devices 981-983 can be access switches, input/output modules, top-of-rack devices and/or the like. Structurally, the edge devices 981-983 can function as both source edge devices and destination edge devices. Accordingly, the edge devices 981-983 can send data (e.g., data packets) to and receive data from the switch fabric 910, and to and from the connected peripheral processing devices 911-916.

In some embodiments, the edge device 981-983 can be a combination of hardware modules and software modules (executing or stored in hardware). In some embodiments, for example, each edge device 981, 982, 983 can include a field-programmable gate array (FPGA), an application specific integrated circuit (ASIC), a digital signal processor (DSP) and/or the like.

The edge devices 981-983 can be configured to prepare a data packet (e.g., an Ethernet packet) to enter the switch fabric 910. In some embodiments, a source edge device 981-983 can be configured to define a header for the data packet, which includes a value that can be used to route the data packet through the switch fabric 910 to a destination edge device 981-983. For example, the source edge device 981-983 can be configured to route the data packet via an egress port of the source edge device 981-983 to a switch of the switch fabric 910 based on a hash function using the value in the header as an input, where the header is defined for the data packet at the source edge device 981-983. Similarly, one or more switches within the switch fabric 910 can be configured to route the data packet through the switch fabric 910 to the destination edge device 981-983 based on a hash function using the value in the header as an input.

Each edge device 981-983 is configured to communicate with the other edge devices 981-983 via the switch fabric 910. Specifically, the switch fabric 910 is configured to provide any-to-any connectivity between the edge devices 981-983 at relatively low latency. For example, switch fabric 910 can be configured to transmit (e.g., convey) data between edge devices 981-983. In some embodiments, the switch fabric 910 can have at least hundreds or thousands of ports (e.g., egress ports and/or ingress ports) through which edge devices 981-983 can transmit and/or receive data. In some embodiments, each edge device 981-983 can be configured to communicate with the other edge devices 981-983 over multiple data paths. More specifically, in some embodiments, multiple data paths containing different sets of switches exist within the switch fabric 910, between a first edge device and a second edge device.

The edge devices 981-983 can include one or more network interface devices (e.g., a 40 Gigabit (Gb) Ethernet interface, a 100 Gb Ethernet interface, etc.) through which the edge devices 981-983 can send signals to and/or receive signals from the switch fabric 910. The signals can be sent to and/or received from the switch fabric 910 via an electrical link, an optical link, and/or a wireless link operatively coupled to the edge devices 981-983. In some embodiments, the edge devices 981-983 can be configured to send signals to and/or receive signals from the switch fabric 910 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 910 can be any suitable switch fabric that operatively couples the edge devices 981-983 to the other edge devices 981-983 via multiple data paths. In some embodiments, for example, the switch fabric 910 can be a Clos network (e.g., a non-blocking Clos network, a strict sense non-blocking Clos network, a Benes network) having multiple stages of switch modules (e.g., integrated Ethernet switches). In some embodiments, for example, the switch fabric 910 can be similar to the switch fabric 100 shown and described with respect to FIG. 1, which has three stages. In other embodiments, the switch fabric 910 can include any number of stages. In such embodiments, for example, the switch fabric 910 can include three, five, seven or nine stages. The switch fabric 910 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

Similar to switches 110, 120, 130 and 140 in FIG. 1, a bidirectional connectivity can be established between two switches within switch fabric 910 that are directly coupled to each other before the two switches can communicate with each other. Although not shown in FIG. 9, switches in switch fabric 910 can be configured to operate according to the three-way handshake protocol described herein, similar to the switches shown and described in FIG. 1 and FIG. 5. Specifically, two switches in switch fabric 910 can be configured to exchange an initialization packet, an acknowledgement packet and a response packet to establish a bidirectional connectivity between the two switches.

In some embodiments, the switch fabric 910 can be (e.g., can function as) a single consolidated switch (e.g., a single large-scale consolidated L2/L3 switch). In other words, the switch fabric 910 can be configured to operate as a single logical entity (e.g., a single logical network element). Similarly stated, the switch fabric 910 can be part of a single logical hop between a first edge device 881, 882, 883 and a second edge device 981, 982, 983 (e.g., along with the data paths between the edge devices 981-983 and the switch fabric 910). The switch fabric 910 can be configured to connect (e.g., facilitate communication between) the peripheral processing devices 911-916. In some embodiments, the switch fabric 910 can be configured to communicate via interface devices (not shown) that are configured to transmit data at a rate of at least 10 Gb/s. In some embodiments, the switch fabric 910 can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

Although the switch fabric 910 can be logically centralized, the implementation of the switch fabric 910 can be highly distributed, for example, for reliability. For example, portions of the switch fabric 910 can be physically distributed across, for example, many chassis. In some embodiments, for example, a stage of the switch fabric 910 can be included in a first chassis and another stage of the switch fabric 910 can be included in a second chassis. Both of the stages can logically function as part of a single consolidated switch (e.g., within the same logical hop) but have a separate single physical hop between respective pairs of stages. More details related to architecture of a multi-stage switch fabric are described herein with respect to FIG. 10.

In use, a data packet (e.g., an Ethernet packet) can be sent between peripheral processing devices 911-916 via portions of the switch fabric 900. For example, as shown in FIG. 9, a data packet can be sent from a first peripheral processing device 913 to a second peripheral processing device 915 via path 970. The first peripheral processing device 913 can send the data packet to the edge device 981 via link 992. The edge device 981 can prepare the data packet to enter the switch fabric 910 by defining a header for the data packet, and can then route the data packet via a link (e.g., shown as the link 993 in FIG. 9) to a switch in the switch fabric 910 based on a value in the defined header. Similar to the edge device 981, one or more switches within the switch fabric 910 can route the data packet through the switch fabric 910 based on the value in the define header of the data packet. Eventually, the data packet is routed from a switch in the switch fabric 910 to the edge device 983 via a link (e.g., shown as the link 994 in FIG. 9), which can then forward the data packet to peripheral processing device 915 via link 995.

Figure 10:
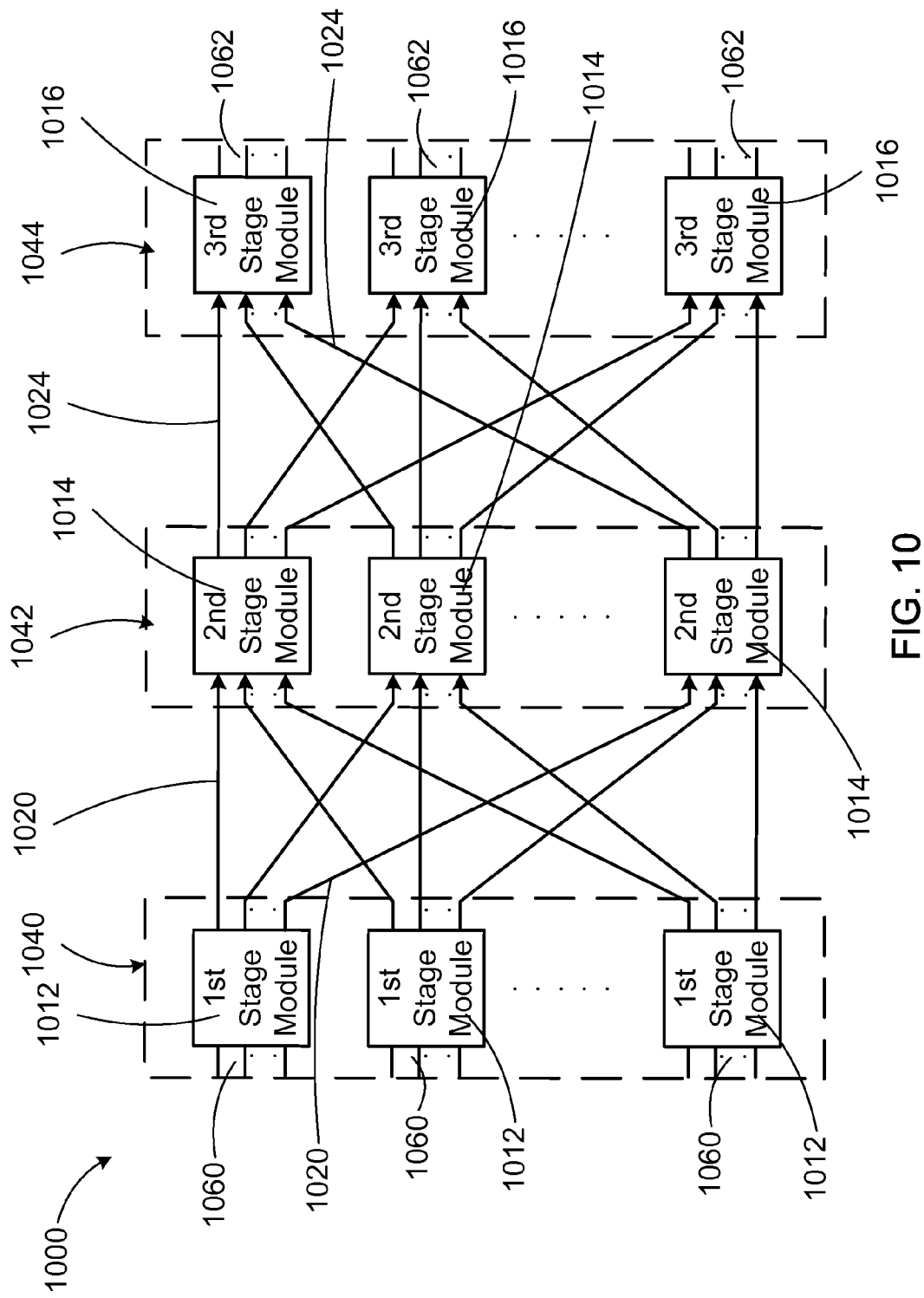
FIG. 10 is a schematic illustration of a multi-stage switch fabric, according to an embodiment.

FIG. 10 is a schematic illustration of a multi-stage switch fabric 1000, according to an embodiment. The switch fabric 1000 can include multiple physical hops that are within a single logical hop. In some embodiments, switch fabric 1000 can be a multi-stage, non-blocking Clos network that includes a first stage 1040, a second stage 1042, and a third stage 1044. The first stage 1040 includes switches 1012; the second stage 1042 includes switches 1014; the third stage 1044 includes switches 1016. Said another way, switches 1012 of the first stage 1040, switches 1014 of the second stage 1042 and switches 1016 of the third stage 1044 collectively define the multi-stage switch fabric 1000.

In the switch fabric 1000, each switch 1012 of the first stage 1040 is an assembly of electronic components and circuitry. In some embodiments, for example, each switch is an application-specific integrated circuit (ASIC). In other embodiments, multiple switches are contained on a single ASIC or a single chip package. In still other embodiments, each switch is an assembly of discrete electrical components.

In some embodiments, each switch 1012 of the first stage 1040 is a packet switch, a frame switch, an integrated Ethernet switch and/or a cell switch. The switches are configured to redirect data (e.g., data packets) as it flows through the switch fabric 1000. In some embodiments, for example, each switch includes multiple ingress ports operatively coupled to write interfaces on a memory buffer (not shown in FIG. 10). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data packet per time period (e.g., one or more clock cycles) and for all egress ports to read one outgoing data packet per time period. Each switch operates similarly to a crossbar switch that can be reconfigured in subsequent each time period.

Each switch 1012 of the first stage 1040 includes a set of ingress ports 1060 configured to receive data (e.g., a data packet) as it enters the switch fabric 1000. For example, each ingress port 1060 can be coupled to an edge device (e.g., edge devices 981, 982, 983 shown and described with respect to FIG. 9). In some embodiments, more than one ingress port 1060 of a switch 1012 can be coupled to different ports of a common edge device via separate physical connections (e.g., multiple electrical cables, multiple fiber-optic cables, etc.). Accordingly, an edge device can send data to the switch fabric 1000 via the ingress ports 1060. In this embodiment, each switch 1012 of the first stage 1040 includes the same number of ingress ports 1060.

Similar to the first stage 1040, the second stage 1042 of the switch fabric 1000 includes switches 1014. The switches 1014 of the second stage 1042 are structurally similar to the switches 1012 of the first stage 1040. Each switch 1014 of the second stage 1042 is operatively coupled to each switch 1012 of the first stage 1040 by a data path 1020. Each data path 1020 between a given switch 1012 of the first stage 1040 and a given switch 1014 of the second stage 1042 is configured to facilitate data transfer from the switches 1012 of the first stage 1040 to the switches 1014 of the second stage 1042.

The data paths 1020 between the switches 1012 of the first stage 1040 and the switches 1014 of the second stage 1042 can be constructed in any manner configured to facilitate data transfer from the switches 1012 of the first stage 1040 to the switches 1014 of the second stage 1042. In some embodiments, for example, the data paths 1020 are optical connectors between the switches. In other embodiments, the data paths 1020 are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each switch 1014 of the second stage 1042 with each switch 1012 of the first stage 1040. In still other embodiments, two or more switches are contained within a single chip package and the data paths are electrical traces.

In some embodiments, the switch fabric 1000 is a non-blocking Clos network. Thus, the number of switches 1014 of the second stage 1042 of the switch fabric 1000 varies based on the number of ingress ports 1060 of each switch 1012 of the first stage 1040. In a rearrangeably non-blocking Clos network (e.g., a Benes network), the number of switches 1014 of the second stage 1042 is greater than or equal to the number of ingress ports 1060 of each switch 1012 of the first stage 1040. Thus, if n is the number of ingress ports 1060 of each switch 1012 of the first stage 1040 and m is the number of switches 1014 of the second stage 1042, m≥n. In some embodiments, for example, each switch 1012 of the first stage 1040 has five ingress ports. Thus, the second stage 1042 has at least five switches 1014. Each of the switches 1012 of the first stage 1040 is operatively coupled to all the switches 1014 of the second stage 1042 by data paths 1020. Said another way, each switch 1012 of the first stage 1040 can send data to any switch 1014 of the second stage 1042.

The third stage 1044 of the switch fabric 1000 includes switches 1016. The switches 1016 of the third stage 1044 are structurally similar to the switches 1012 of the first stage 1040. The number of switches 1016 of the third stage 1044 is typically equivalent to the number of switches 1012 of the first stage 1040. Each switch 1016 of the third stage 1044 includes egress ports 1062 configured to allow data to exit the switch fabric 1000. For example, each egress port 1062 can be coupled to an edge device (e.g., edge devices 981, 982, 983 shown and described with respect to FIG. 9). In some embodiments, similar to switches 1012 of the first stage 1040, more than one egress port 1062 of a switch 1016 can be coupled to different ports of a common edge device via separate physical connections (e.g., multiple electrical cables, multiple fiber-optic cables, etc.). Accordingly, the edge device can receive data from the switch fabric 1000 via the egress port 1062. In this embodiment, each switch 1016 of the third stage 1044 includes the same number of egress ports 1062. Further, the number of egress ports 1062 of each switch 1016 of the third stage 1044 is typically equivalent to the number of ingress ports 1060 of each switch 1012 of the first stage 1040.

Each switch 1016 of the third stage 1044 is connected to each switch 1014 of the second stage 1042 by a data path 1024. The data paths 1024 between the switches 1014 of the second stage 1042 and the switches 1016 of the third stage 1044 are configured to facilitate data transfer from the switches 1014 of the second stage 1042 to the switches 1016 of the third stage 1044.

The data paths 1024 between the switches 1014 of the second stage 1042 and the switches 1016 of the third stage 1044 can be constructed in any manner configured to facilitate data transfer from the switches 1014 of the second stage 1042 to the switches 1016 of the third stage 1044. In some embodiments, for example, the data paths 1024 are optical connectors between the switches. In other embodiments, the data paths are within a midplane. Such a midplane can be used to connect each switch 1014 of the second stage 1042 with each switch 1016 of the third stage 1044. In still other embodiments, two or more switches are contained within a single chip package and the data paths are electrical traces.

Similar to the switches shown and described with respect to FIG. 1 and FIG. 5, two switches in two adjacent stages within switch fabric 1000 can be configured to establish a bidirectional connection according to a three-way handshake protocol. Particularly, if a first switch of a stage is connected to multiple switches of an adjacent stage through a LAG-based multipath connectivity while a second switch from the multiple switches is connected to the first switch but not through any LAG-based multipath connectivity, then the handshake protocol described in detail herein can be applied to the first switch and the second switch. For example, a switch 1012 of the first stage 1040 is connected to each of the switches 1014 of the second stage 1042 through a LAG-based multipath connectivity, and a switch 1014 of the second stage 1042 is connected to the switch 1012 but not through any LAG-based multipath connectivity. Thus, the switch 1012 of the first stage 1040 can exchange an initialization packet, an acknowledgement packet and a response packet with the switch 1014 of the second stage 1042, to establish a bidirectional connection between the two switches, according to the handshake protocol described in detail herein. Particularly, the packets exchanged between the two switches can be structurally and functionally similar to initialization packet 600, acknowledgement packet 700 and response packet 800 shown and described with respect to FIGS. 6-8.

Figure 11:
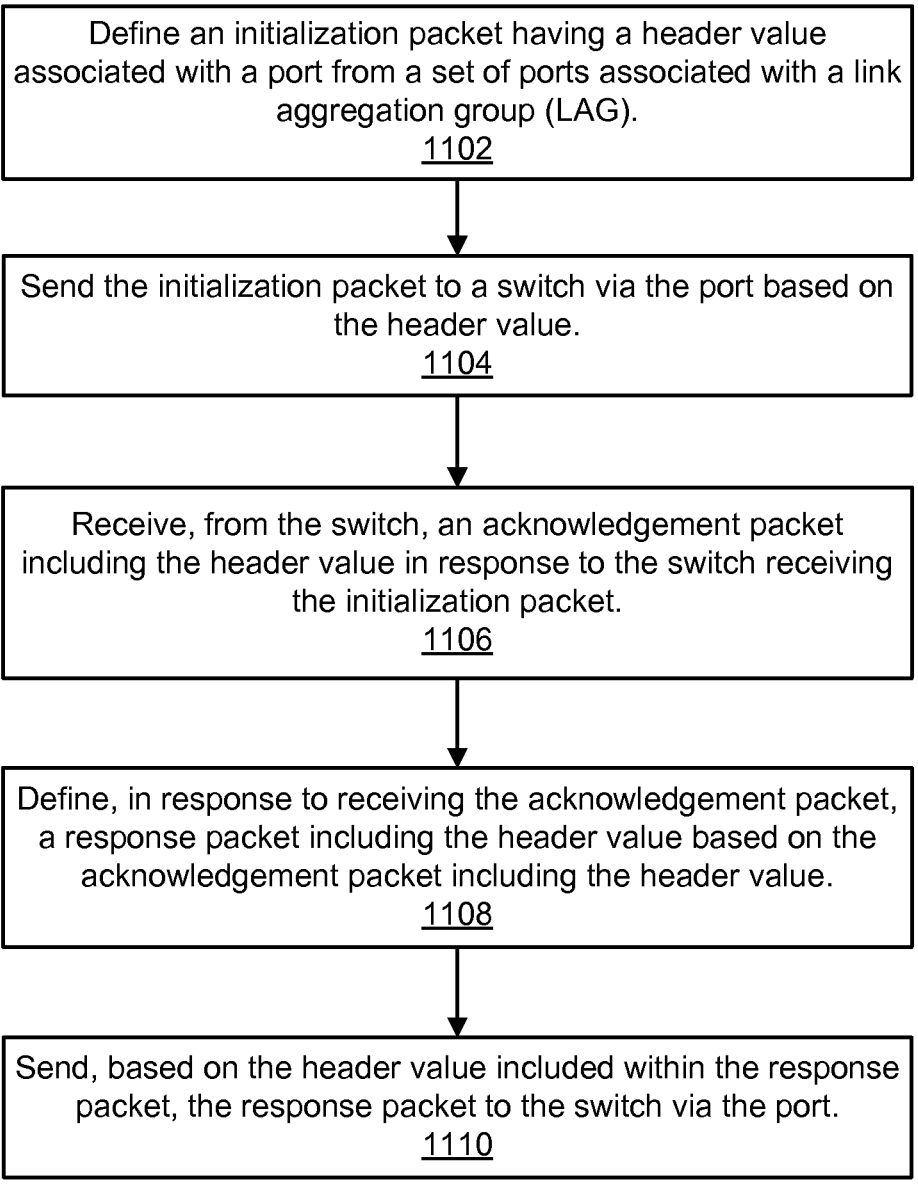
FIG. 11 is a flow chart that illustrates a method for establishing a connection between two switches based on a handshake protocol, according to an embodiment.

FIG. 11 is a flow chart that illustrates a method for establishing a connection between two switches based on a handshake protocol, according to an embodiment. Each of the two switches involved in the handshake process is associated with a different stage within a multi-stage switch fabric, and the two switches are directly coupled to each other. In some embodiments, a first switch of the two switches is connected to a set of switches, including a second switch of the two switches, based on a LAG multipath connectivity. The second switch is connected to the first switch, but not via any LAG-based connectivity. In such embodiments, the hashing mechanism described herein (e.g., a hash function) can be used at the first switch to send a packet to a switch from the set of switches, while a packet can be sent from the second switch to the first switch in a deterministic fashion.

At 1102, an initialization packet is defined at the first switch to have a header value associated with a port from a set of ports associated with a LAG. To initiate the handshake process with the second switch, the first switch is configured to define the initialization packet that includes a header value within a header portion of the initialization packet. Specifically, the header value associated with a desired port, via which the first switch is coupled to the second switch, is selected by the first switch to be used in the initialization packet. For example, the header value can be determined based on a port number of the desired port and a reverse hash lookup table (e.g., reverse hash lookup table 400 in FIG. 4) stored in the first switch, which associates each valid header value with a specific port number. For another example, the header value can be determined based on an index value associated with the desired port and a reverse hash lookup table stored in the first switch, which associates each valid header value with a specific index value. In such an example, when the initialization packet is processed at, for example, an output module in the first switch, the index value can be determined as a result of a hash function that uses the corresponding header value as an input. Subsequently, the index value can be used to access, for example, a port table stored in the first switch and identify the desired port to send the initialization packet based on the index value. Thus, the initialization packet with an appropriate header value is defined at the first switch. Additionally, the desired port coupled to the second switch is a port from a set of ports at the first switch that are associated with a LAG. Each port from the set of ports is coupled to a switch of an adjacent stage, including the second switch, through a LAG-based multipath connectivity.

In the example of FIG. 1, to initiate a handshake process with a downstream switch (e.g., switch 130) coupled to switch 140, switch 140 can be configured to define an initialization packet that includes a header value within a header portion of the initialization packet. The header value included in the initialization packet is associated with port 144, which is coupled to port 134 of switch 130. Such a header value can be determined by switch 140 based on for example, a reverse hash lookup table stored in switch 140, which maps a port number of port 144 to the header value. Additionally, port 144 is from a set of ports associated with a LAG connecting switch 140 with multiple switches of an adjacent stage including at least switch 120 and switch 130. The LAG for switch 140 is represented by link-group 164, as shown in FIG. 1, and the set of ports includes at least port 142 and port 144.

At 1104, the initialization packet is sent by the first switch to the second switch via the port based on the header value. The initialization packet is processed by for example, an output module (e.g., output module 230 in FIG. 2) of the first switch before being sent out of the first switch. Specifically, a hash engine (e.g., hash engine 235 in FIG. 2) of the output module produces a port number associated with a port by using a hash function that takes the header value included in the initialization packet as an input. Because the header value is associated with the port number of the port coupled to the second switch, the port number is produced by the hash engine, and consequently the port coupled to the second switch is selected to send the initialization packet. As a result, the initialization packet is sent out of the first switch via the port, thus to reach the second switch.

In the example of FIG. 1, switch 140 is configured to process the initialization packet to determine a port to send the initialization packet based on the header value included in the initialization packet. Because the header value associated with port 144 is used for defining the initialization packet, port 144 is selected by switch 140 to send the initialization packet. Thus, the initialization packet is sent out from switch 140 via port 144, to further reach switch 130 over link 158.

At 1106, an acknowledgement packet is received from the second switch at the first switch. The acknowledgement packet includes the header value in response to the second switch receiving the initialization packet. Specifically, after receiving the initialization packet from the first switch, the second switch is configured to construct the acknowledgement packet based on the received initialization packet. Particularly, the second switch is configured to retrieve the header value from the header portion of the initialization packet, and then include the header value in for example, a payload portion of the acknowledgement packet. The second switch is then configured to send out the acknowledgement packet via the same port from which the initialization packet was previously received. Thus, the acknowledgement packet including the header value is received by the first switch.

In the example of FIG. 1, after receiving the initialization packet from switch 140 via port 134, switch 130 is configured to construct an acknowledgement packet based on the received initialization packet. Specifically, switch 130 is configured to retrieve the header value from the initialization packet and then include the header value in a payload portion of the acknowledgement packet. Next, switch 130 is configured to send out the acknowledgement packet via port 134, thus to reach switch 140 over link 158. As a result, the acknowledgement packet including the header value is received by switch 140 via port 144.

At 1108, in response to receiving the acknowledgement packet, a response packet is defined at the first switch to include the header value based on the acknowledgement packet including the header value. After receiving the acknowledgement packet from the second switch, the first switch is configured to define the response packet based on the received acknowledgement packet. Specifically, the first switch is configured to retrieve the header value of the initialization packet from for example, the payload portion of the acknowledgement packet, and then use the retrieved header value in a header portion of the response packet. As a result, the response packet has the same index value as the initialization packet that was previously sent from the first stage to the second stage.

In the example of FIG. 1, after receiving the acknowledgement packet from switch 130 via port 144, switch 140 is configured to define a response packet based on the received acknowledgement packet. Specifically, switch 140 is configured to retrieve the header value of the original initialization packet from the payload portion of the acknowledgement packet, and then include the header value in a header portion of the response packet. Thus, the response packet defined at switch 140 has the same header value as the original initialization packet that was sent from switch 140 to switch 130.

At 1110, based on the header value included within the response packet, the response packet is sent by the first switch to the second switch via the port. The response packet is processed in the same way as the original initialization packet, for example, by an output module of the first switch. Similar to the initialization packet, the hash engine of the output module produces a port number associated with a port by using the hash function that takes the header value included in the response packet as an input. Because the header value of the response packet is the same as the one for the initialization packet, the port number produced for the response packet based on the header value is the same as the one produced for the initialization packet based on the same header value. In other words, the port selected to send the response packet is the same as the one for sending the initialization packet. Thus, the response packet is sent out of the first switch via the same port as the port for sending the initialization packet, thus to reach the second switch in the same way as the initialization packet.

In the example of FIG. 1, switch 140 is configured to process the response packet to determine a port to send the response packet, in a similar way as for the initialization packet. Specifically, a port is selected by for example, a hash function executed within switch 140, based on the header value included in the header portion of the response packet. Because the header value of the response packet is the same as the one for the initialization packet, the same port is selected for the response packet as for the initialization packet. As a result, the response packet is sent out from switch 140 via port 144, thus to reach switch 130 over link 158, in the same way as the initialization packet.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIGS. 1-5 as a switch using a hash function to determine a port based on a header value included in a packet to send out the packet, in other embodiments, other methods can be used to determine a port to send out the packet. For example, an output module of a switch can store a lookup table that maps a header value to a port of the switch, such that a port can be determined from a header value based on the lookup table. Such a lookup table can be in a reversed form of reverse hash lookup table 400 shown in FIG. 4.

While shown and described above with respect to FIGS. 2-4 as an upstream switch originating an initialization packet to be sent to a downstream switch, in other embodiments, an upstream switch can originate multiple initialization packets to be sent to multiple downstream switches. Particularly, an upstream switch can generate multiple initialization packets, each of which has a different header value, such that each initialization packet can be transmitted to one of multiple downstream switches (connected with the upstream switch via a LAG-based connectivity) via a different port of the upstream switch. In such embodiments, the upstream switch can expect to receive an acknowledgement packet in response to each initialization packet, and the responder ID included in each acknowledgement packet can be used to determine an identity of the respective downstream switch. Additionally, if more than one initialization packet is transmitted to a common downstream switch (e.g., the upstream switch is connected to the downstream switch via multiple ports and paths), the responder IDs included in the acknowledgement packets received from that downstream switch can be the same. Additionally, the initialization packets, acknowledgement packets, and/or response packets can also include identifiers other than the source ID and responder ID that are associated with the switches (e.g., the upstream switch and/or the downstream switch). For example, those packets can include identifiers associated with the LAG or ports of the upstream switch.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:
1. An apparatus, comprising:
a first switch configured to define a first initialization packet having a first header value associated with a first port from a plurality of ports associated with a link aggregation group (LAG), the first switch configured to send the first initialization packet to a second switch via the first port based on the first header value, the first switch configured to receive an acknowledgement packet including the first header value from the second switch in response to the second switch receiving the first initialization packet, the first switch configured to retrieve the first header value from the acknowledgement packet such that the first switch defines, in response to the first switch receiving the acknowledgement packet, a response packet having the first header value, the first switch configured to send the response packet to the second switch via the first port based on the first header value, the first switch configured to define a second initialization packet having a second header value associated with a second port from the plurality of ports, the first switch configured to send the second initialization packet to a third switch via the second port based on the second header value.

2. The apparatus of claim 1, wherein the first switch is configured to use the first header value as an input to a hash function to produce a hash index associated with the first port from the plurality of ports, the response packet being routed to the second switch via the first port from the plurality of ports based on the hash index.

3. The apparatus of claim 1, wherein the first switch is configured to assign the first header value to the first initialization packet using a reverse hash lookup.

4. The apparatus of claim 1, wherein the first switch is configured to define the first initialization packet such that the first initialization packet includes the first header value within a header portion of the first initialization packet, the first switch is configured to receive the acknowledgement packet such that the acknowledgement packet includes the first header value in a payload portion of the acknowledgement packet.

5. The apparatus of claim 1, wherein the first switch includes a processing pipeline configured to process the response packet based on the first header value prior to the first switch sending the response packet to the second switch via the first port.

6. The apparatus of claim 1, wherein the first switch is configured to be within a first stage of a distributed multi-stage switch and the second switch is configured to be within a second stage of the distributed multi-stage switch.

7. The apparatus of claim 1, wherein the second switch and the third switch are from a plurality of switches, each port from the plurality of ports is uniquely associated with a switch from the plurality of switches.

8. A non-transitory processor-readable medium storing code representing instructions to be executed by a processor, the code comprising code to cause the processor to:

define a first initialization packet having a first header value associated with a first port from a plurality of ports associated with a link aggregation group (LAG);

send the first initialization packet to a first switch via the first port based on the first header value;

receive, from the first switch, an acknowledgement packet including the first header value in response to the first switch receiving the first initialization packet;

define, in response to receiving the acknowledgement packet, a response packet including the first header value based on the acknowledgement packet including the first header value;

send, based on the first header value included in the response packet, the response packet to the first switch via the first port;

define a second initialization packet having a second header value associated with a second port from the plurality of ports; and send the second initialization packet to a second switch via the second port based on the second header value.

9. The non-transitory processor-readable medium of claim 8, the code further comprising code to cause the processor to:

send the response packet to the first port from the plurality of ports based on an output of a hash function using the first header value as an input to the hash function.

10. The non-transitory processor-readable medium of claim 8, wherein the code to cause the processor to define the first initialization packet includes code to cause the processor to define the first initialization packet having the first header value based on a reverse hash lookup.

11. The non-transitory processor-readable medium of claim 8, wherein the first switch is within a stage of a distributed multi-stage switch.

12. The non-transitory processor-readable medium of claim 8, wherein the first switch is from a plurality of switches, each port from the plurality of ports is uniquely associated with a switch from the plurality of switches.

13. The non-transitory processor-readable medium of claim 8, wherein the acknowledgement packet includes the first header value in a payload portion of the acknowledgement packet, the code to cause the processor to define the response packet includes code to cause the processor to define the response packet to include the first header value in a header portion of the response packet.

14. An apparatus, comprising:

a first switch configured to receive, from a second switch, an initialization packet associated with a first link of a link aggregation group (LAG) having a second link operatively coupled to a third switch configured to receive, from the second switch, an initialization packet (1) associated with the second link and (2) used to validate the second link, the first link being validated based at least in part on the initialization packet associated with the first link, the initialization packet associated with the first link having a header portion including a header value, the first switch configured to define an acknowledgement packet having a payload portion including the header value in response to receiving the initialization packet associated with the first link, the first switch configured to send the acknowledgement packet to the second switch such that the second switch defines a response packet having a header portion including the header value, the first switch configured to receive the response packet based on the header portion of the response packet including the header value.

15. The apparatus of claim 14, wherein the first switch is associated with a stage of a distributed multi-stage switch different than a stage of the distributed multi-stage switch associated with the second switch.

16. The apparatus of claim 14, wherein the first switch is configured to receive the initialization packet associated with the first link and the response packet from a common port of the second switch based on both the header portion of the initialization packet associated with the first link and the header portion of the response packet including the header value.

17. The apparatus of claim 14, wherein the first switch is configured to define the acknowledgment packet having the payload portion including the header value such that the second switch can send the response packet via a common port as the initialization packet associated with the first link.

18. The apparatus of claim 14, wherein the initialization packet associated with the first link, the acknowledgement packet and the response packet are configured to collectively validate a portion of the LAG.

19. The apparatus of claim 14, wherein the LAG is a multipath LAG at the second switch, the multipath LAG operatively coupling the second switch with a plurality of switches including the first switch and the third switch.

20. The apparatus of claim 14, wherein the first switch is configured to send the acknowledgement packet to the second switch via a port at the first switch, the first switch is configured to receive the initialization packet associated with the first link via the port.

* * * * *